United States Patent [19]
Suman, Jr.

[11] 3,835,929
[45] Sept. 17, 1974

[54] METHOD AND APPARATUS FOR PROTECTING ELECTRICAL CABLE FOR DOWNHOLE ELECTRICAL PUMP SERVICE

[75] Inventor: George O. Suman, Jr., Houston, Tex.

[73] Assignee: Shell Oil Company, Houston, Tex.

[22] Filed: Aug. 17, 1972

[21] Appl. No.: 281,575

[52] U.S. Cl................ 166/315, 166/65, 166/75
[51] Int. Cl........................ E21b 43/00, E21b 33/03
[58] Field of Search ..... 166/315, 75, 153, 77, 65 R; 254/134.4

[56] References Cited
UNITED STATES PATENTS

| | | | |
|---|---|---|---|
| 1,629,329 | 5/1927 | Werner | 166/65 R |
| 2,297,020 | 9/1942 | Page | 166/65 R |
| 2,677,427 | 5/1954 | McKinney et al. | 166/77 |
| 2,720,266 | 10/1955 | Broussard et al. | 166/77 |
| 3,212,582 | 10/1965 | Brown | 166/242 |
| 3,301,531 | 1/1967 | Corsiglia | 254/134.4 |
| 3,373,818 | 3/1968 | Rike et al. | 166/77 |
| 3,394,760 | 7/1968 | Childers et al. | 166/315 |
| 3,401,749 | 9/1968 | Daniel | 166/77 |
| 3,525,401 | 8/1970 | Hanson et al. | 166/315 |

Primary Examiner—James A. Leppink

[57] ABSTRACT

Leak proof protection is provided for electrical cable used in supplying power to electrically driven pumps installed in subterranean wells by inserting the cable into length(s) of coiled tubing and including seal means at the lower end.

2 Claims, 6 Drawing Figures

PATENTED SEP 17 1974 3,835,929

METHOD AND APPARATUS FOR PROTECTING ELECTRICAL CABLE FOR DOWNHOLE ELECTRICAL PUMP SERVICE

BACKGROUND OF THE INVENTION

The invention relates to a method of significantly increasing electrical cable life used in production of fluids from subterranean formations and more particularly to a method of protecting the insulation means surrounding the conductor from breakdown and subsequent blowout caused by gas intrusion into the cable sheath. The insulation will also be protected against swelling due to the presence of other hydrocarbons and loss of insulating properties due to impregnation with well salt water.

DESCRIPTION OF THE PRIOR ART

The oil industry in its efforts to maximize the recovery of hydrocarbons has been continuously increasing the number of high volume electrically driven submersible pump installations while at the same time increasing both the depth settings as well as the horsepower and capacity requirements of these pumps.

Electrical cable used for submersible pump installations is expensive ($20,000 for a typical 9,000 foot well) making it economically advantageous to maximize cable life. Prior art cables usually incorporate a flexible metal armor covering that surrounds the outer diameter of the cable. This method offers some protection from mechanical damage, but permits gas, oil and/or brine to intrude into the elastomer sheath and insulation that covers the multiple conductors. Alternatively, a flat cable design offers a partial solution when lead is used as the protective sheath. However, lead armored cable is expensive while having the additional drawbacks of being heavy and delicate to handle.

SUMMARY OF THE INVENTION

The present invention solves the problems in prior art cable by inserting into length(s) of standard coiled tubing a multiple conductor electrical cable increasing the service life of downhole electrical cable. The use of coiled tubing permits a surface connection of the cable to the motor.

A further significant advantage of the present invention is that gas, oil and/or brine intrusion into the elastomer sheath and insulation is prevented by suitably sealing the entire length of cable from the operating environment encountered while in service.

BRIEF DESCRIPTION OF THE DRAWING

The nature of the present invention will be more fully appreciated with reference to the drawing in which.

DESCRIPTION OF A PREFERRED EMBODIMENT

Figure 1:
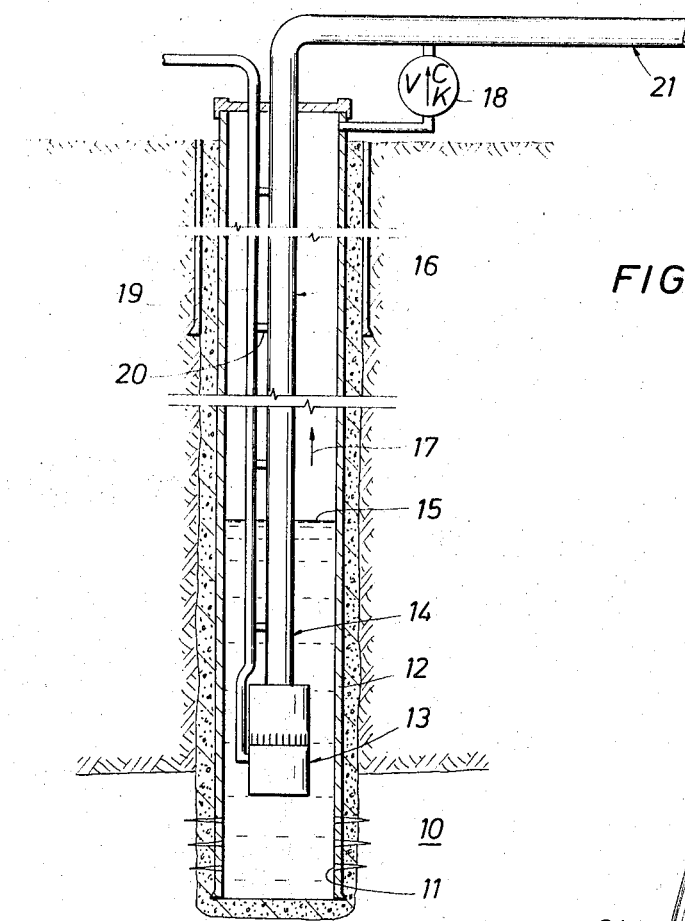
FIG. 1 illustrates a high volume lift installation.
Figure 2:
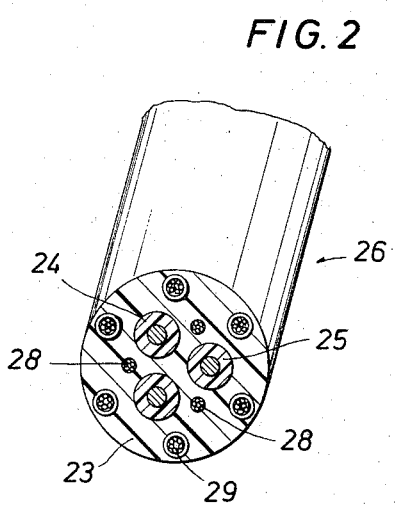
FIG. 2 shows a multiple conductor cable without protective armor.
Figure 3:
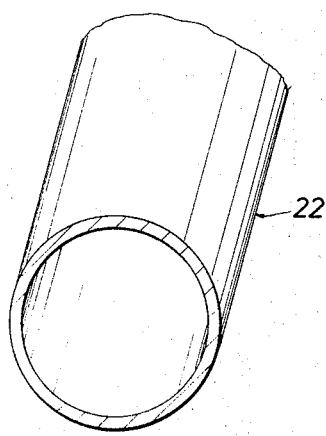
FIG. 3 shows the armor adapted for use by the present invention.
Figure 4:
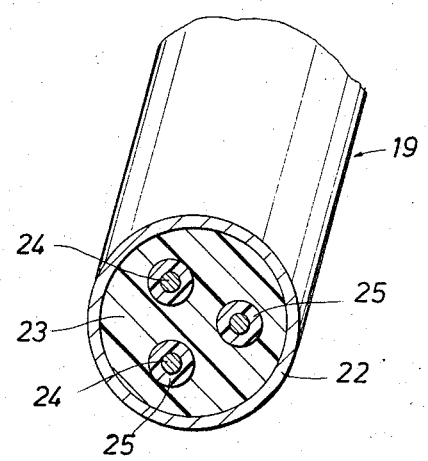
FIG. 4 illustrates the tubing armored cable.
Figure 5:
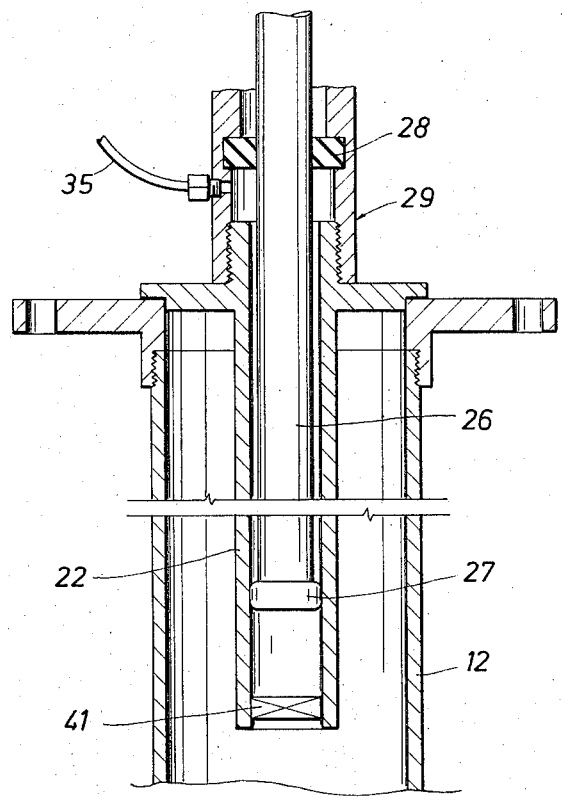
FIG. 5 illustrates one method of cable installation.

Referring to FIGS. 1–4, well casing 12 is shown in fluid communication with a subterranean formation 10 through a set of perforations 11 allowing fluid to enter casing 12. A typical high volume lift installation with a submersible pump and motor 13 are suspended in well casing 12 by tubing 14 with applicant's tubing armored electrical cable 19 in electrical communication with the motor end installed in well casing 12. The armored cable 19 includes a cable such as 26 composed of three large circular metallic conductors 24 each being encased by a suitable insulating material 25. The three insulated conductors 24 are encapsulated within an abrasion resistant encapsulating material 23, which might be nylon, such that the conductors 24 are maintained in a relatively fixed relationship. The cable 26 may also include small electrically conductive cables 28 which may be used to transmit downhole information regarding pump and motor conditions, pressure and temperature conditions, or other desirable information to the surface. The cable 26 may also include tension wireline members or an exterior double steel braid to act both as a tension bearing member and abrasion resistent sheath. Other means for handling the tensile load could also be applied as are presently used in the cabling industry. Also, the tensile load may be transmitted to the exterior tube by placing a solidifying fluid between the cable and exterior tube. Other embodiments include suspension of the interior cable from various locations within the outer tube. The cable 26, when inserted into the tubing 22, makes up applicant's tubing armored cable 19 as shown in FIG. 4. Tubing armored cable 19 is secured to tubing 14 by clamps 20 at various points along tubing 14 such that cable 19 is substantially parallel to tubing 14. An optimum submersible pump installation will usually have a check valve 18 installed so that the annular space between the casing 12 and the tubing 14 is connected to flowline 21 in order to vent the produced gas 17 to flowline 21 to maintain the annulus pressure substantially equal to the pressure in flowline 21. Preferably, the produced gas 17 is vented to maximize pump performance. An ideal pump installation is designed so that the pumping fluid level 15 is only a few hundred feet, say 200–300 feet, above the inlet of the submersible pump. In so doing, the flowing pressure of the formation 12 will usually fall below the bubble point causing gas breakout before entering the pump. From this it is obvious that it is essential to vent the gas 17 to flowline 21 rather than maintain the gas 17 in the well casing 12 as this can cause gas intrusion into an unarmored cable and severely hinder pump performance. However, during production, gas, oil and/or brine permeates into the elastomer sheath insulation material reducing the insulation properties. Also, during routine pump and motor repair, the equipment is pulled from the well exposing the cable to ambient pressure and temperature conditions. The entrained gas and/or oil expands, damaging the elastomer coverings. Further, the elastomer sheath or cover may be damaged while installed in the well due to pressure fluctuations imposed by fluid level variations during shut down or start up of the submersible pump. Elastomers presently known in the art are incapable of withstanding extended exposure to the oil, gas, water, pressure, and temperature environment encountered in the typical submersible pump installation. Usually a cable will be spliced several times as a result of a burn-out prior to running a new cable. By armoring the electrical cable with tubing and suitably sealing the lower end where it enters the electrical motor 13 the present invention has advantageously and simply solved this troublesome problem.

One method of practicing the present invention would be to pull the production equipment from the casing 12 to provide a well casing specifically for manufacturing purposes and suspend tubing 22 in casing 12 a distance approximately equal to the submersible pump setting depth. If desired, the coiled tubing would have a tubing plug 41 installed at its lower end to prevent fluid intrusion. Cable 26 would then be inserted into tubing 22 and a suitable gripping device could then be used to force the cable 26 through the coiled tubing 22. Such a gripping device is disclosed in U.S. Pat. Nos. 2,677,427 and 2,720,266 and as such would grip the circumference of the cable 26 and be sufficiently long so that the force per unit length of the cable would be small, thereby precluding any unnecessary damage to the encapsulating material surrounding the metallic conductors. The cable 26 could also have guide means removably attached to its lower end to assure that the cable 26 would not have any tendency to kink in tubing 22 while being installed. The guide means at the lower end would be of sufficient mass to partially maintain cable 26 in substantially concentric alignment with the tubing 22. Alternatively, suitable sealing means such as a wiper or seal 27 could be attached to the cable 26 end and by installing a lubricator 29 with seal means 28 at the upper end of tubing 22, the cable 26 could be pumped through tubing 22 as an installation procedure using a suitable pressure source 35. Another method of installation would naturally be to have the tubing 22 and cable 26 delivered to location as a complete assembly. Vertical insertion of the cable 26 into the tubing 22 may provide an important assist to the insertion procedure since the weight of the cable itself will be acting to pull the cable into the tubing. However, the previously described procedure may be utilized for horizontal insertion as well.

A necessary consideration for installing electrical cable in tubing is to assure adequate tensile strength of unarmored cable to prevent insulation separation from either the weight of the cable, or alternatively, if the cable is installed by pumping means the net force applied to the cross-sectional area of cable 26. The tensile strength can be attained in several ways such as by incorporating insulated wire ropes 29 into the body of the cable. The cable outer diameter should be smaller than the inside diameter of tubing 22 and have a protective covering that provides maximum abrasion resistance while at the same time offering minimal frictional resistance to movement through the tubing during installation. A lubricant that is not harmful to the cable elastomer can be used to reduce frictional resistance and facilitate cable insertion into the tubing.

An initial installation, for example, would consist of using a coiled tubing unit (not shown) for running coiled tubing 22 into well casing 12 to the desired depth. Cable 26 would then be inserted into tubing 22 using any of the previously described means. Tubing 22 may be either metallic or plastic depending upon the depth or desire of the operator. The assembly or tubing armored cable 19 would then be removed from casing 12 by spooling the tubing with the cable inside using a coiled tubing rig (not shown). The submersible pump and motor 13 would then be assembled and connected to tubing 14 and electrically connected and suitably sealed to tubing armored cable 19 and lowered into casing 12 while installing clamps 20 to join production tubing 14 and cable 19 to maintain them in a substantially parallel relationship.

Figure 6:
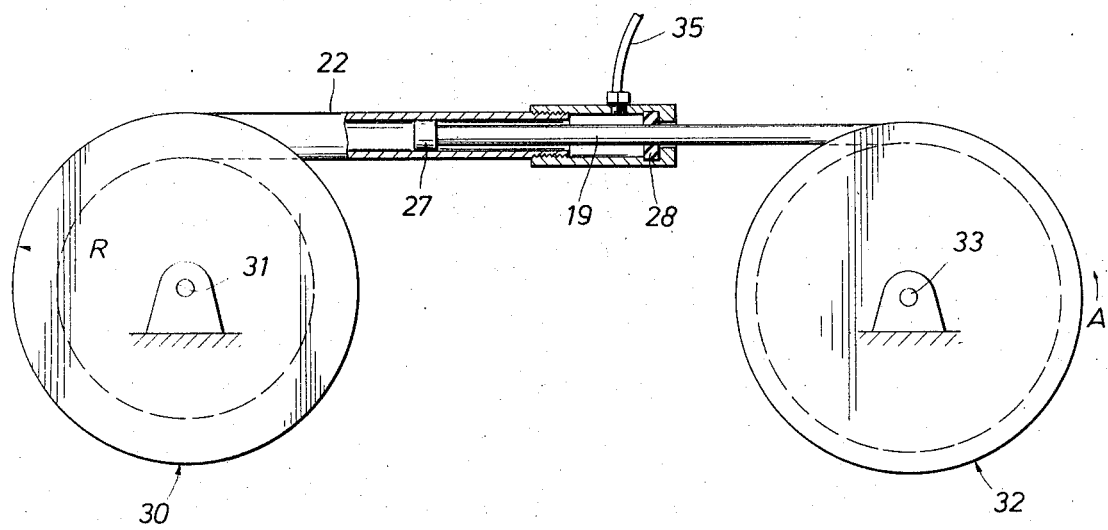
FIG. 6 illustrates an alternate method of cable installation.

In another embodiment of the invention shown in FIG. 6, the cable 26 could be spooled on a reel 32 that is mounted to rotate about axis 33. Drive means (not shown) could be provided to rotate reel 32 in a direction as shown by arrow A assisting the insertion of cable 26 into tubing 22. The tubing 22 would also be spooled on a reel 30 mounted about an axis 31, the reel having a radius R which would be a minimum radius consistent with transportation requirements and the additional reisistance to movement of cable 26 relative to tubing 22 during insertion of cable 26 in tubing 22 in a circular manner rather than a vertical manner. If necessary, reel 30 could be of a large radius R, say 10 to 25 feet to minimize this resistance. After insertion of cable 26 into tubing 22 using a reel having a large radius R the tubing armored cable would preferably be re-spooled onto a reel having a smaller radius R for ease of handling. The cable 26 would be pumped through tubing 22 using the previously described procedure for vertical insertion.

An even further method of practicing the present invention would be to insert the cable 26 into tubing 22 using the previously described gripping means or pressurizing means when tubing 22 and cable 26 are in a horizontal plane rather than in the previously described vertical plane. By using this method the tubing armored cable could be delivered to the desired location as a package and therefore not require the insertion of the cable 26 into tubing 22 at location while suspended in the casing 12.

I claim as my invention:

1. A method of installing multiple conductor electric cable into armoring means for use in a subterranean well comprising the steps of:
    lowering coiled tubing into the well bore to a depth approximately equal to the pump setting depth;
    inserting the lower end of a multiple conductor electric cable into the coiled tubing at its upper end;
    attaching gripping means about the circumference of the cable and along a sufficient length of the cable;
    applying sufficient force through said gripping means to the cable thereby forcing the lower end of said cable through said tubing; and
    installing a tubing plug in the lower end of said coiled tubing prior to lowering said coiled tubing into the well bore lower end first.

2. A method of installing tubing armored electrical cable in a subterranean well comprising the steps of:
    unreeling coiled tubing and lowering said tubing into the well bore to a depth approximately equal to the pump setting depth;
    inserting a multiple conductor electrical cable into said tubing to a depth approximately equal to the pump setting depth;
    pulling said tubing and said cable from said well bore and re-reeling said tubing and said cable as a single unit;
    mating a downhole motor and pump assembly with a production tubing string;
    electrically connecting said electrical cable to said motor;
    sealably connecting said tubing armored electrical cable to said downhole motor preventing intrusion of gaseous mixtures from the surrounding environment;

lowering said production tubing and tubing armored cable into said well bore; and clamping said tubing armored cable to said production tubing thereby maintaining said tubing armored cable and said production tubing in a substantially parallel relationship.

* * * * *